Oct. 8, 1963　　　　　L. B. GAEKE　　　　　3,106,150
PORTABLE BARBECUE DEVICE
Filed Sept. 17, 1957　　　　　　　　　　　2 Sheets-Sheet 2
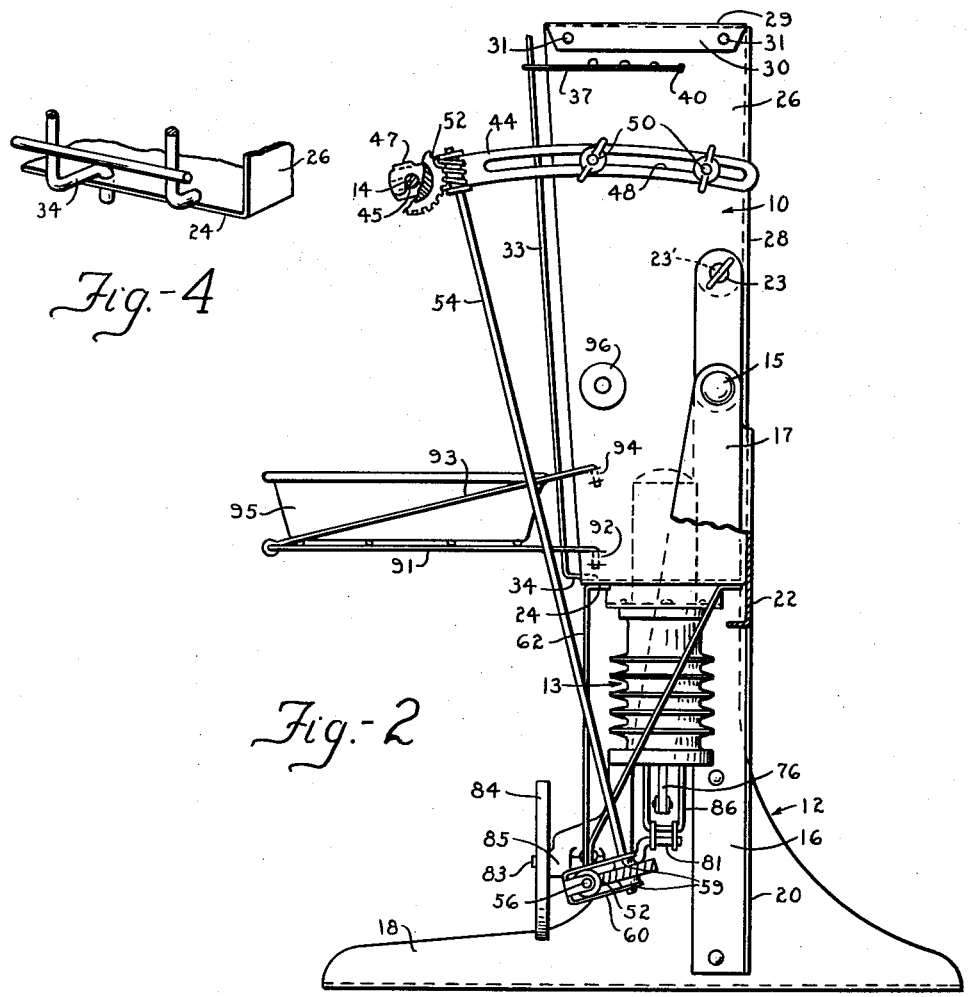
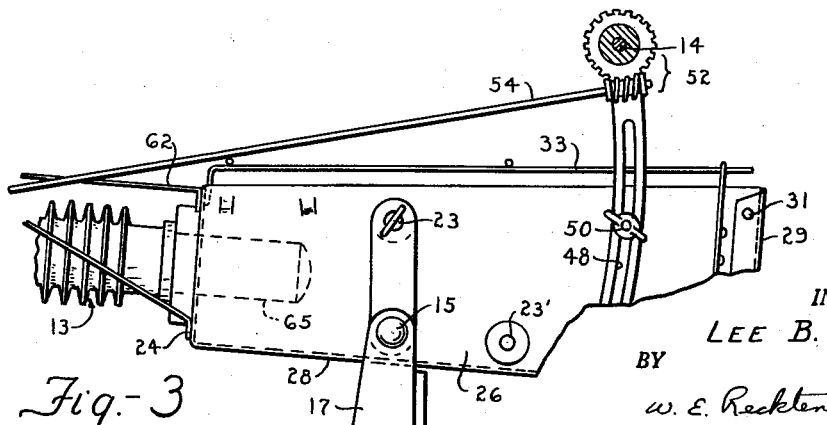
INVENTOR.
LEE B. GAEKE
BY
W. E. Recktenwald.
ATTORNEY

United States Patent Office 3,106,150
Patented Oct. 8, 1963

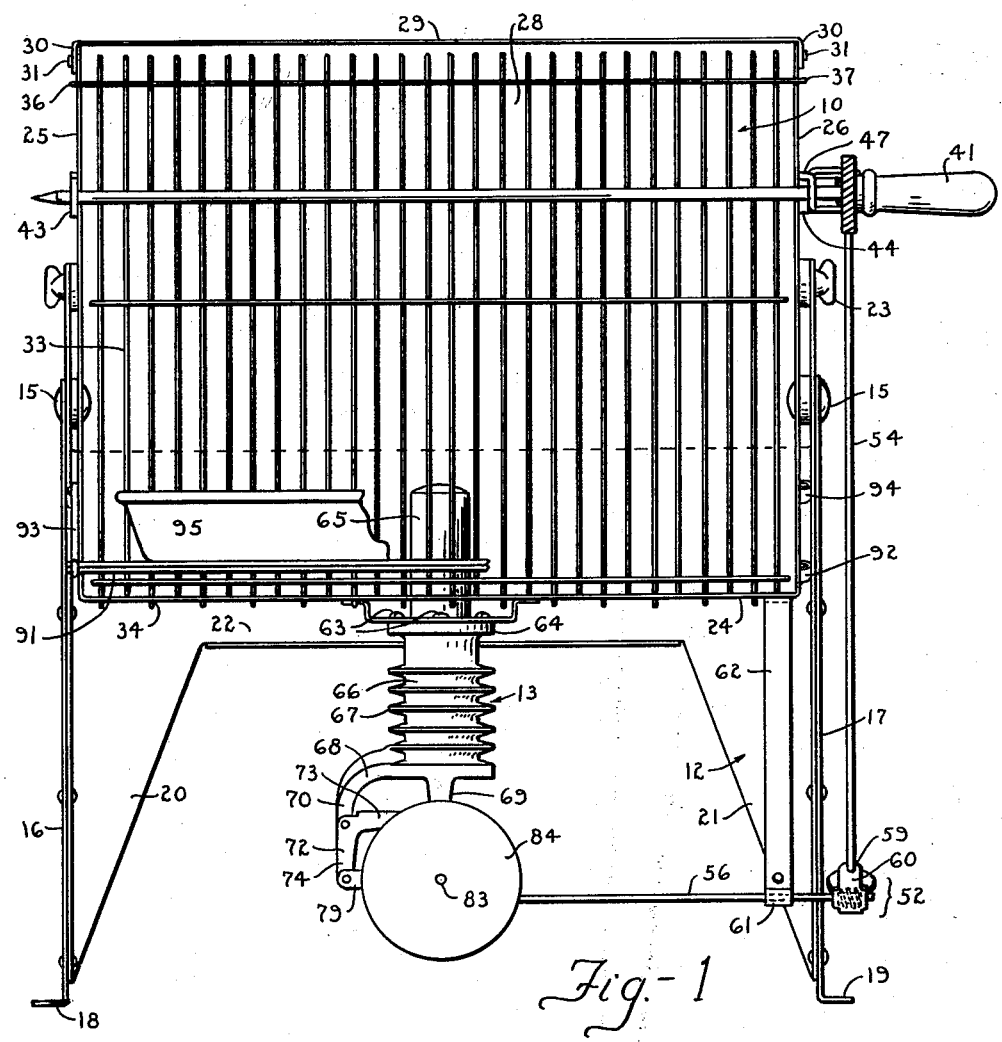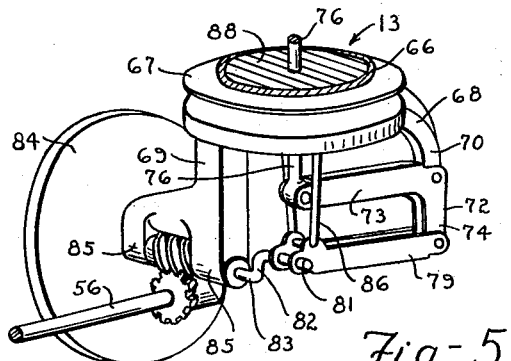

3,106,150
PORTABLE BARBECUE DEVICE
Lee B. Gaeke, Bucyrus, Ohio, assignor to The Sta-Rite Manufacturing Company, Bucyrus, Ohio, an Ohio partnership
Filed Sept. 17, 1957, Ser. No. 684,474
3 Claims. (Cl. 99—340)

This invention relates to a portable barbecue device and more particularly it relates to an automatically operated rotating spit mechanism for a barbecue device.

Numerous types of barbecue stands are being sold on the market today which most frequently include a rotating spit driven by an electric motor. Such devices, while they are generally satisfactory for their intended purposes, have the distinct disadvantage of requiring a convenient electric outlet to operate the motor for rotating the spit and its impaled item that is intended to be barbecued. Thus, for example, the barbecue device cannot be used on camping trips or visits to the beach, where electric power is not readily available.

It is, therefore, a primary object of this invention to overcome the above-noted disadvantages of the prior art and to provide an improved barbecue device that is substantially independent of any exterior sources of electric power for operation.

It is another object of this invention to provide an improved barbecue device that has the rotating spit driven by means of the heat of the fire within the barbecue device itself.

It is still another object of this invention to provide an improved barbecue device that may be operated in either a horizontal or vertical position depending on the type of food being prepared or the personal preference of the operator of the device.

It is a further object of this invention to provide an improved barbecue device having the rotating spit in a position to receive adequate amounts of heat for cooking purposes without having the food drippings fall into the firebox with the resulting undesirable flaming up of the fire, smoking, etc.

It is a still further object of this invention to provide an improved barbecuing device wherein the speed of rotation of the spit depends somewhat on the amount of heat being radiated from the fire.

And a still further object of this invention is to provide a barbecue device that is relatively simple to manufacture, economical to maintain, highly efficient in use and capable of a long usable life.

With the foregoing and other objects in view, which will appear as the description proceeds, the invention consists in the novel features hereinafter described in detail, illustrated in the accompanying drawings, and more particularly pointed out in the appended claims.

In the drawings:

FIGURE 1 is a front elevational view of my improved barbecuing device with the firebox mounted in a vertical position;

FIGURE 2 is a side elevational view of the device of FIGURE 1 with parts broken away;

FIGURE 3 is a side elevational view of the device with the firebox tilted into the horizontal position;

FIGURE 4 is a perspective view of one corner of the grill portion of the device; and FIGURE 5 is a perspective view partially in section of the hot air engine of the device.

Referring to the drawings wherein similar reference numerals refer to similar parts throughout the several views, the numeral 10 designates a substantially rectangular firebox, which in FIGURES 1 and 2 is in the vertically disposed position, a base or support 12 for said firebox and a hot-gas or hot-air engine 13 for driving a spit 14 in close proximity to the open side of the firebox. The base or support 12 is pivotally mounted at 15 to the firebox 10 and comprises a pair of spaced apart leg members 16, 17 having feet portions 18, 19 and inwardly formed web portions 20, 21, respectively, attached together by the plate 22. It will be noted that the feet 18, 19 extend fore and aft of the firebox a considerable distance so as to add rigidity and stability to the assembled device. A wing headed screw 23 passes through an extension of each leg 16, 17 and into threaded engagement with the anchor portions 23' to lock the firebox in vertical position.

The firebox 10 has a lower side portion 24, vertically disposed side portions 25 and 26, a back plate 28 and an upper side portion 29 overhanging the side portions 25 and 26 at 30. Coacting detents or catches 31 are formed in the side portions 25 and 26 and overhanging portions 30 to hold the side 29 assembled to the firebox. By pulling upon the side 29, the detents release their grip so that the side 29 is removed, making it possible to add fuel to the fire. The open front side of the firebox is covered by a wire grate or grill 33 which is pivotally mounted at its lower edge 34 by means of alternate vertical rods of the grill extending through openings in the lower side portion 24 of the firebox, such that the relative depth and location of the fire relative to the meat or the like being grilled can be varied. This variation is effected by means of the adjusting members 36, 37 carried by the opposite sides of the upper portion of the grill 33 which extend rearwardly into overlapping relationship with respect to a plurality of spaced apertures 38 formed in the upper portion of the opposite sides 25, 26 of the firebox. A hook or pin 40 is formed on the ends of each of the adjusting members 36, 37 and is adapted to be seated in one of said apertures 38 in the firebox such as to position the grill 33 relative to the firebox proper.

The spit 14, having an insulated handle 41 at one end portion, is removably and rotatably mounted on the brackets 43, 44 relative to the firebox. The spit is mounted in slots 45 in the brackets 43, 44 and is removable therefrom upon release of the retainer 47 which holds the spit in the slots 45 in the brackets. The brackets 43, 44 are arcuate in shape and have elongated slots 48 formed therein in substantially overlapping relation with respect to side walls 25, 26 of the firebox. Adjusting screws 50 pass through the slots 49 and engage with threaded portions in the side of the firebox so that in the loosened condition of the screws 50 the spit can be adjusted relative to the firebox. As will be obvious, the adjusting screws 50 when locked will hold the brackets 43, 44 firmly in a substantially horizontal position which cannot be readily jarred out of position by the operation of the spit or by movement of the barbecue device itself.

Any suitable linkage can be provided between the spit 14 and the hot-gas engine 13 and, as illustrated, the linkage comprises a pair of worm wheel and worm gear sets 52 which are provided respectively between the spit 14 and the intermediate shaft 54 and between the intermediate shaft 54 and a drive shaft 56 from the hot-gas or hot-air engine such as to reduce the speed of rotation of the spit. The intermediate shaft 54 is rotatably mounted relative to the firebox in bearings 58 carried by the bracket 44 on the firebox and by the bearings 59 in the cage 60 which holds the worm wheel and worm gear in engaging relation. The drive shaft 56 is rotatably mounted at one end portion by means of the bearing 59 in the cage 60 and by the bearing 61 carried by the support 62 on the lower side portion 24 of the firebox 10.

The hot air engine 13 is mounted by screws 63 through the flange 64 onto the lower side portion 24 of the firebox with the heat sensitive portion 65 of the hot air engine projecting into the fire chamber of the firebox so as to be positioned in the hottest part of a fire burning in the firebox. The specific hot air engine 13 illustrated forms no part of this invention since there are many known types on the market which will operate in this device. For illustration, the engine shown in FIGURES 1, 2 and 3 will be described in brief. The piston cylinder 66 is attached to the heat sensitive portion 65 on the outside of the firebox such that a plurality of fins 67 formed on the outside of said cylinder will serve to assist in cooling the cylinder by radiation. A pair of support arms 68, 69 extend from one end of the cylinder 66 and lie in planes at right angles to each other. Arm 68 has a downwardly depending leg 70 on the end portion of which is pivotally mounted by means of a pin 71 a bell crank 72 at the point of intersection of the two axes of the legs 73, 74 of the bell crank. The upper, longer leg 73 of the bell crank is pivotally mounted at its free end portion to one end of a connector rod 76 carried by a dasher piston, not shown, reciprocably mounted in the heat sensitive portion 65 of the engine 13. The dasher piston fits loosely relative to the portion 65 and acts in the cycle of operation at about 90° out of phase with the piston in the cylinder 66 for displacing air alternately from the heating to the cooling end of the engine and back again. The dasher piston is moved by the one end of the leg 73 of the bell crank in unison with movement of the end of leg 74 of the bell crank. The shorter leg 74 of the bell crank is pivotally connected to a link 79 which has its other end connected to the offset member 81 of the driving lever 82 carried by a short shaft 83 keyed to a flywheel 84. The shaft 83 and flywheel 84 rotate together about their axes. The shaft 83 is rotatably mounted in a bearing 85 formed in the support arm 69 carried by the cylinder 66. A connecting rod 86 is connected to the main piston 88 in the cylinder 66 and extends into operative engagement with the end portion of the link 79 near the offset member 81 of the lever 82. Starting with the piston 88 at the peak of its stroke so that the crank 72 is in the uppermost position as shown in FIG. 5, the dasher piston connected to the rod 76 is midway between the top and bottom of the heat portion 65. As the air in the top of portion 65 expands, the piston 88 is driven downward rotating the crank 82 in a clockwise direction which in turn pivots the crank 72 in a counterclockwise direction about its pivot 71. Movement of the crank 82 starts to rotate the flywheel 84 which in turn helps to keep the system in motion. The leg 73 of the crank 72 pulls the rod 76 downward so as to move the dasher piston in the portion 65 downward thereby displacing more cool air into the heat chamber 65 to be heated and expanded to further drive the piston 88 downward. As the piston 88 passes through the midpoint of its downward stroke, the dasher piston has reached its lowest point of travel so that the majority of the air in the system is displaced into the heat chamber 65 for heating and expanding. As the piston 88 passes through the low point of its travel, the dasher is midway between the ends of the chamber 65 and is displacing hot air into the cool end of the chamber 66 where the fins 67 radiate and disperse the heat so as to cool and contract the air in the chamber. As the piston 88 passes through the midpart of its upward movement, the dasher is at its highest point such that the bulk of the air in the system is being cooled and contracted in the finned portion of the chamber 66. Cooling of the air contracts the volume in the chamber and pulls the piston 88 upward. The heating and expanding, and cooling and contracting of the air in the closed chamber provides the source of power for rotating the spit. A worm gear 89 is fixed on the shaft 83 which is adapted to mesh with a worm wheel 90 fixed on the shaft 56. Rotation of the shaft 56 will rotate the shaft 54, hence the spit 14 through the linkage referred to above. The flywheel 84 is used primarily to smooth out the pulsating type motion of the hot air engine so that the spit will be driven at a steady pace.

With the firebox 10 in the vertical position of FIGURES 1 and 2, a wire rack 91 is removably mounted relative to the bottom portions of the grill of the firebox by inserting downturned ends 92 in struck out portions of the firebox. A pair of braces 93 are positioned on opposite sides of the outer end portion of the rack 91 and extend upwardly into fastened relation with respect to the firebox by the downturned ends 94 engaging in struck out portions of the firebox. The rack 92 and braces 93 can be removed from the structure when not needed or when the firebox is to be pivoted to the horizontal position. A drip pan 95 is adapted to be carried on the rack 91 so as to catch drippings and the like from the meat or other foodstuff being prepared. In this manner, no drippings and the like from the food will fall into the fire to cause smoke and fire flare-ups.

There are occasions when it is desired to use the firebox grill for directly grilling meats, corn, etc., or for heating coffee, etc., with or without the spit being used. At such times, the firebox can be pivoted about pins 15 to the horizontal position such as shown in FIGURE 3. To prepare the firebox for this movement relative to the base, the pan 95, rack 91 and braces 93 are removed from the device, the winged screws 23 are threaded out of anchor 23' whereupon the firebox can be pivoted about 15 to the horizontal position. The winged screws 23 are threaded into the anchor portions 96 so as to secure the firebox locked in horizontal position. The spit 14 can continue to be driven by the hot air engine 13 and the grill 33 can be used to grill hamburgers, hot dogs and the like.

During the grilling of a piece of meat with the firebox in the vertical position of FIGURES 1 and 2, the meat can be moved closer or farther from the firebox by loosening the screws 50 and pivoting the spit closer or farther from the coals in the firebox. When in proper position, the screws 50 are reset. Likewise, the fire can be moved closer to the meat by removing the hook ends 40 of the adjusting members 36, 37 from the apertures 38 in the firebox and reinserting same in any other aperture depending on the degree of heat required at the moment.

When the meat on the spit 14 is done to the desired degree, the spit 14 can be removed from the brackets 43, 44 by pivoting the retainers 47 out of position and lifting the spit from the slots 45 in said brackets. The worm wheel and worm gear in the gear set 52 are disengaged in an obvious manner.

From the foregoing, it is obvious that I have attained the objects of my invention and have provided an improved barbecuing device having means for rotating the spit without the need for electrical outlets. The device is a single, self-supporting, independently operated barbecue stand that is highly efficient and relatively inexpensive. The improved device is adapted for use, both in the vertical and horizontal positions, and is adjustable for various ranges of heating. Relatively no drippings or the like can fall into the fire in one position of the device so as to prevent smoking and other undesirable after-effects. I have illustrated and described a present preferred embodiment of the invention as applied to a barbecue device. It will be understood, however, that the invention is not limited to the form shown, but may be otherwise embodied within the scope of the following claims.

I claim:

1. A barbecue unit comprising a base, a rectangularly-shaped firebox having one open side, a grill fastened over said open side, means for fastening said firebox on said base with said grill facing horizontally thereof, a pair of arcuate-shaped arms carried by opposite side walls of the firebox and projecting outwardly beyond the grill on the open side of the firebox at substantially right angles to the plane of said grill, a spit member extending between the outer end portions of said arms in spaced relation to said grill on the open side of the firebox, means for adjusting said spit member relative to said grill, a hot air engine mounted on one wall of said firebox, a heat sensitive portion of said engine projecting into a heated portion of said firebox, means connecting the output of said engine to said spit for turning said spit, and means for pivoting said firebox and said attached engine to a vertical position relative to said base.

2. In a portable barbecue unit comprising a base, an open-sided firebox carried by said base and having a grill extending over the open side thereof, a pair of arcuate-shaped arms carried by the opposite side walls of said firebox and having an end portion of each extending past the grill and outwardly beyond the open side of the firebox, a spit member extending between parts of said end portions of the arms in spaced relation to said grill and to said open side of said firebox, a piston driven, reciprocating hot-air engine carried by said firebox with a heat sensitive portion thereof projecting into said firebox, means for drivingly connecting said engine to said spit for turning said spit about its longitudinal axis relative to said grill, the center of curvature of the arc of said arcuate-shaped arms being located at the output of the hot-air engine whereby the spit can be adjusted relative to the grill, and means for pivoting said firebox and said attached engine between horizontal and vertical positions.

3. In a portable barbecue unit and in combination, a base, a firebox carried by said base, said firebox having a base wall and a plurality of integrally formed transversely disposed side walls for defining an opening therein, a grill carried by said firebox in position for covering said opening, a pair of arms carried by oppositely disposed side walls and extending outwardly beyond said grill on the open side of said firebox, a spit member extending between the extending portions of the arms in spaced relation to the grill and to the opening in the firebox, a self-contained closed hot-air engine mounted on one side wall of said firebox with a sealed heat sensitive portion extending into a heated portion of said firebox, means drivingly connecting said engine to said spit, and means for pivoting said firebox and said mounted engine from one position having the grill facing horizontally with the engine extending upwardly into the firebox to another position having the grill facing vertically with the engine extending horizontally into the firebox.

References Cited in the file of this patent

UNITED STATES PATENTS

| | | |
|---|---|---|
| 175,050 | Dejey | Mar. 21, 1876 |
| 1,085,671 | Day | Feb. 3, 1914 |
| 1,336,599 | Tsekurus | Apr. 13, 1920 |
| 1,605,143 | Renfroe | Nov. 2, 1926 |
| 2,321,427 | Schelling | June 8, 1943 |
| 2,573,988 | Saltzberg | Nov. 6, 1951 |
| 2,804,012 | Dong | Aug. 27, 1957 |
| 2,813,478 | Popple | Nov. 19, 1957 |

FOREIGN PATENTS

| | | |
|---|---|---|
| 160,828 | France | Mar. 10, 1884 |